US008661818B2

(12) United States Patent
Nakamura et al.

(10) Patent No.: US 8,661,818 B2
(45) Date of Patent: Mar. 4, 2014

(54) HOT DRY ROCK GENERATION SYSTEM

(75) Inventors: Takashi Nakamura, Tokyo (JP); Koji Hiramoto, Tokyo (JP); Ichiro Nakajo, Tokyo (JP); Yoshiyuki Yokohama, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 229 days.

(21) Appl. No.: 13/057,676

(22) PCT Filed: Feb. 23, 2009

(86) PCT No.: PCT/JP2009/053778
§ 371 (c)(1),
(2), (4) Date: Apr. 25, 2011

(87) PCT Pub. No.: WO2010/095277
PCT Pub. Date: Aug. 26, 2010

(65) Prior Publication Data
US 2011/0187126 A1 Aug. 4, 2011

(51) Int. Cl.
*F03G 7/00* (2006.01)
(52) U.S. Cl.
USPC .......................................... 60/641.2; 60/641.3
(58) Field of Classification Search
USPC ............................................... 60/641.1–641.5
See application file for complete search history.

(56) References Cited

U.S. PATENT DOCUMENTS

| | | | |
|---|---|---|---|
| 3,908,381 A | 9/1975 | Barber et al. | |
| 4,142,108 A | 2/1979 | Matthews | |
| 4,776,169 A * | 10/1988 | Coles, Jr. | 60/641.2 |
| 5,311,741 A | 5/1994 | Blaize | |
| 5,366,514 A * | 11/1994 | Becnel et al. | 23/303 |
| 5,515,679 A | 5/1996 | Shulman | |
| 5,685,362 A * | 11/1997 | Brown | 165/45 |
| 7,320,221 B2 * | 1/2008 | Bronicki | 60/641.2 |

(Continued)

FOREIGN PATENT DOCUMENTS

| | | |
|---|---|---|
| GB | 2041196 A | 9/1980 |
| JP | 55-43209 A | 3/1980 |

(Continued)

OTHER PUBLICATIONS

Australian Office Action dated Sep. 28, 2011, issued in corresponding Australian Patent Application No. 2009340665.

(Continued)

*Primary Examiner* — Thomas Denion
*Assistant Examiner* — Brian Inacay
(74) *Attorney, Agent, or Firm* — Westerman, Hattori, Daniels & Adrian, LLP

(57) ABSTRACT

A hot dry rock generation system, having: a recharge well that is formed from the ground to an underground hot dry rock into which a heat carrier streams through the recharge well; a production well that is formed from the underground hot dry rock from which the heated heat carrier is streams through the production well; a power generation plant that converts the thermal energy of the heat carrier streaming out of, into electric energy; a collecting tank that stores the heat carrier discharged from the power generation plant; a sealing water pump that sucks the heat carrier collected in the collecting tank and makes the heat carrier stream into the recharge well, whereby the hot dry rock generation system is provided with a heat exchanger into which the heat carrier streaming out of the production well streams.

5 Claims, 6 Drawing Sheets

(56) References Cited

U.S. PATENT DOCUMENTS

| | | |
|---|---|---|
| 2008/0169084 A1 | 7/2008 | Bullivant |
| 2008/0271453 A1 | 11/2008 | Faget-Mora |
| 2010/0300092 A1 | 12/2010 | Eli et al. |

FOREIGN PATENT DOCUMENTS

| | | |
|---|---|---|
| JP | 57-59679 A | 4/1982 |
| JP | 59-86368 U | 6/1984 |
| JP | 60-035182 A | 2/1985 |
| JP | 63-246403 A | 10/1988 |
| JP | 4-234576 A | 8/1992 |
| JP | 2603948 B2 | 4/1997 |
| JP | 10-147931 A | 6/1998 |
| JP | 11-223176 A | 8/1999 |
| JP | 2008-248837 A | 10/2008 |

OTHER PUBLICATIONS

International Search Report of PCT/JP2009/053778, date of mailing May 19, 2009.

Japanese Office Action dated Nov. 18, 2011, issued in corresponding Japanese Patent Application No. 2011-500443.(English translation only; original document submitted with IDS filed Dec. 6, 2011).

Japanese Office Action dated May 11, 2012, issued in corresponding Japanese Patent Application No. 2011-500443, with English translation (6 pages).

International Preliminary Report on Patentability (Form PCT/IB/373) of International Application No. PCT/JP2009/053778 dated Sep. 13, 2011, with Form PCT/ISA/237.

Australian Office Action dated Oct. 16, 2012, issued in corresponding Australian patent application No. 2009340665 (5 pages).

Jeffrey, Rob et al., "Geothermal energy: hot fractured rocks", Internet Article, http://www.csiro.au/en/Organisation-Structure/Divisions/Earth-Science—Resource-En . . . ; Nov. 9, 2009 (Updated Oct. 30, 2012); 4 pages.

Japanese Office Action dated Nov. 18, 2011, issued in corresponding Japanese Patent Application No. 2011-500443.

Australian Office Action dated Mar. 4, 2013, issued in corresponding Australian Patent Application No. 2009340665.

\* cited by examiner

HOT DRY ROCK GENERATION SYSTEM

BACKGROUND OF THE INVENTION

1. Field of the Invention

The present invention relates to a hot dry rock generation system in which a heat carrier is made stream into the high temperature hot dry rock existing underground; the heat carrier heated by the hot dry rock is collected; and, power generation is performed by use of the heated heat carrier.

It is hereby noted that the term "invention" or "present invention" in this specification means the aspect, the mode or the embodiment disclosed by this specification.

2. Background of the Invention

The hot dry rock generation system is conventionally known to the public (e.g. Patent References JP 1978-246403, JP1992-234576 and JP1999-223176); in the conventional hot dry rock generation system, a heat carrier is made stream into the high temperature hot dry rock deeply situated beneath the ground surface (e.g. at the depth of the 2000 to 4000 m). Hereby, the hot dry rock means high temperature rock existing underground; preferable hot dry rock is high temperature rock that includes few cracks or gaps that can contain hot-water, hot-water circulating system being not developed in the hot dry rock. In addition, in this application, the hot-water means high temperature water in which gasified steam is to be included.

Further, the recharge well and the production well are chutes (boring holes) that are bored by an excavator having a mechanism in which a rotor fitted in a long cylindrical stator revolves (e.g. Patent References JP 1998-14731). Further, steel pipes are inserted in the boring hole; concrete is poured into the space between the steel pipes and the boring hole. Thus, the water (heat carrier) tightness (regarding the wells) is achieved. Further, after the chutes are formed, the excavation is performed further deeply, by additional several meters from the bottom of the chutes; and, high pressure water is sent to the hot dry rock through the steel pipes so that high water pressure works on the bedrock of the hot dry rock, and cracks are formed in the hot dry rock.

By use of such hot dry rock as a heat source, water is converted into steam; thus, the hot dry rock generation system obtains the underground thermal energy on the ground; the hot dry rock generation system adopts a configuration such as shown in FIG. 8. As shown in FIG. 8, the hot dry rock generation system is different from the general system of the geothermal power plant in that the hot dry rock generation obtains the underground thermal energy by passing water through the hot dry rock R that existing deep underground and is provided with artificial cracks.

The recharge well 1 and the production well 2 are formed as flow passages that reach the hot dry rock R; water is charged into the recharge well 1, while hot-water is discharged through the production well 2. The recharge well 1 and the production well 2 communicate with each other via the cracks formed in the hot dry rock R.

Further, the water charged into the recharge well 1 reaches the hot dry rock R, streams through the cracks (the spaces formed with the cracks), runs upward through the production well 2, and is discharged as hot-water to the ground from the production well. The hot-water discharged on the ground is guided to the power generation plant 3 so as to drive the steam turbine and generate electric power. After being utilized in the power generation plant 3, the hot-water returns back to the collecting tank 4. The temperature of the hot-water that returns back to the collecting tank 4 exceeds 100° C. The water stored and cooled in the collecting tank 4 is sucked by the sealing water pump 5 and charged again into the recharge well 1.

In the conventional hot dry rock generation system, however, when the hot-water which temperature exceeds 100° C. is discharged toward or into the collecting tank 4, the hot-water is once set free toward the open air; due to the relieved energy, a vast amount of white smoke is generated so as to defile the landscape of the site. Further, since the water in the collecting tank 4 is placed under a boiling condition, the operators who work in the neighborhood of the collecting tank 4 are exposed to danger. Incidentally, the make-up water W is supplied to the collecting tank 4 so that the water dissipation is compensated, the water dissipation being caused by the water consumption while the water passes through hot dry rock R.

SUMMARY OF THE INVENTION

In view of the inconveniences or difficulties of the conventional technology, the present invention aims at providing a hot dry rock generation system in which the temperature of the heat carrier can be appropriately regulated, and the thermal energy can be utilized so as to save energy.

In order to overcome the difficulties, the present invention discloses a hot dry rock generation system may include, but not limited to, a recharge well that is formed to be extended from a ground to a hot dry rock provided underground into which a heat carrier is charged through the recharge well, a production well that is formed to be extended from the ground to the hot dry rock provided underground from which the heat carrier heated by the hot dry rock streams out to the ground through the production well, a power generation plant that converts thermal energy of the heat carrier streaming out of the production well to the ground into electric energy, a collecting tank that stores the heat carrier discharged from the power generation plant, and a sealing water pump that sucks the heat carrier collected in the collecting tank and makes the heat carrier stream into the recharge well, wherein the hot dry rock generation system may further include, but not limited to, a heat exchanger into which the heat carrier streaming out of the production well streams.

According to the above-described disclosure, a heat exchanger is provided so that the heat carrier streaming out of the production well is charged into the heat exchanger; thus, the temperature of the heat carrier can be further increased at the heat exchanger, or the thermal energy of the heat carrier can be absorbed at the heat exchanger so as to supply the absorbed thermal energy to a heat consumption plant. Accordingly, the temperature of the heat carrier can be appropriately regulated, and the thermal energy can be utilized so as to save energy.

A preferable embodiment of the present invention is the hot dry rock generation system, wherein the heat exchanger is arranged between the power generation plant and the collecting tank, the hot dry rock generation system further comprising a heat consumption plant that consumes the thermal energy supplied from the heat exchanger. According to the above-described disclosure, in a case where the temperature of the heat carrier discharged from the power generation plant is still high, the thermal energy can be supplied to a heat consumption plant such as warm pool facilities, via the heat exchanger, without making the thermal energy dissipate outward. In other words, in a case where the temperature of the heat carrier discharged from the power generation plant utilizing the primary part of the thermal energy of the heat carrier is still higher than the ambient temperature, the heat consuming plant can utilize the secondary part of the thermal energy of the heat carrier; in this way, the thermal energy can be effectively utilized in and over two stages. Further, the temperature of the heat carrier discharged into the collecting tank can be decreased to a level near to the ambient temperature; thus, white smoke generation in the neighborhood of the collecting tank can be evaded. Moreover, the operators who work in the neighborhood of the collecting tank can be free from the danger of burns. In addition, potential countermeasures against the high temperature regarding the sealing water pump feeding the water back to the hot dry rock can be dispensed with. Another preferable embodiment is the hot dry rock generation system, wherein the heat exchanger is arranged between the production well and the power generation plant, the hot dry rock generation system further comprising a heat supply plant that supplies the thermal energy to the heat exchanger.

According to the above-described disclosure, by use of the heat exchanger, the working fluid streaming therein can be heated-up or cooled, and the amount of the thermal energy utilized in the rower generation plant can be adjustable. In other words, the temperature of the heat carrier can be increased by transmitting the heat energy from the heat supply plant to the heat carrier via the heat exchanger; this temperature increase is effective in a case where the temperature of the heat carrier discharged from the production well is not sufficient to reach the temperature level that the power generation plant side requires. And, it becomes unnecessary to increase the number of the recharge wells as well as production wells, even when the increase in the power output of the power generation plant is desired.

Another preferable embodiment is the hot dry rock generation system, the hot dry rock generation system may further includes, but not limited to, an RPM control unit that controls a delivery head of the sealing water pump, a flow regulating valve that is arranged between the sealing water pump and the recharge well, or between the production well and the power generation plant, a controller that controls the RPM control unit, a computing unit that computes the information regarding the delivery head of the sealing water pump or the opening level of the flow regulating valve, the information being transmitted to the controller, and a sensor that is arranged on a flow passage provided between the production well and the power generation plant such that the information regarding heat carrier temperature and heat carrier pressure are transmitted to the computing unit.

According to the above-described disclosure, the temperatures and the pressures of the heat carrier that is discharged from the production well and streams toward power generation plant can be measured. Based on the measured temperatures and pressures, the delivery head and the opening level of the sealing water pump are determined so that the flow rate and the pressure of the heat carrier discharged from the production well are regulated. Hence, the flow rate and the pressure of the heat carrier discharged from the production well can be stabilized; further, the controller receives load setting signals from the power generation plant so that the hot dry rock generation system can be operated while keeping the optimal hot-water flow rate in response to the power output of the generator.

Another preferable embodiment is the hot dry rock generation system, wherein the sensor that transmits the pressure information to the computing unit is arranged on the flow passage provided between the production well and the power generation plant, and a feedforward correction is incorporated in the computing unit based on the pressure information transmitted from the sensor.

According to the above-described disclosure, the pressure of the heat carrier before the recharge well is also measured; thus, the heat carrier pressure loss between the inlet of the recharge well and the outlet of the production well can be measured so that the change of the state of the hot dry rock can be detected. Further, control correction according to feedforward control approach is performed so that the pressure on the production well side is stabilized.

Another preferable embodiment is the hot dry rock generation system, wherein the sensor that transmits the temperature information to the computing unit is arranged on the flow passage provided between the production well and the power generation plant, and the difference between the temperature of the heat carrier at the outlet of the production well and the temperature of the heat carrier at the inlet of the recharge well is measured.

According to the above-described disclosure, the temperature of the heat carrier before the recharge well is also measured; thus, the heat carrier temperature difference between the inlet of the recharge well and the outlet of the production well can be measured so that the heat carrier temperature is detected without being influenced by the atmospheric temperature on the ground. Further, when the pressure of the heat carrier before the recharge well is also measured, the flow rate measurement can be also performed; accordingly, thermal heat energy that the heat carrier obtains underground can be measured.

DETAILED DESCRIPTION OF THE PREFERRED EMBODIMENTS

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

(First Embodiment)

Figure 1:
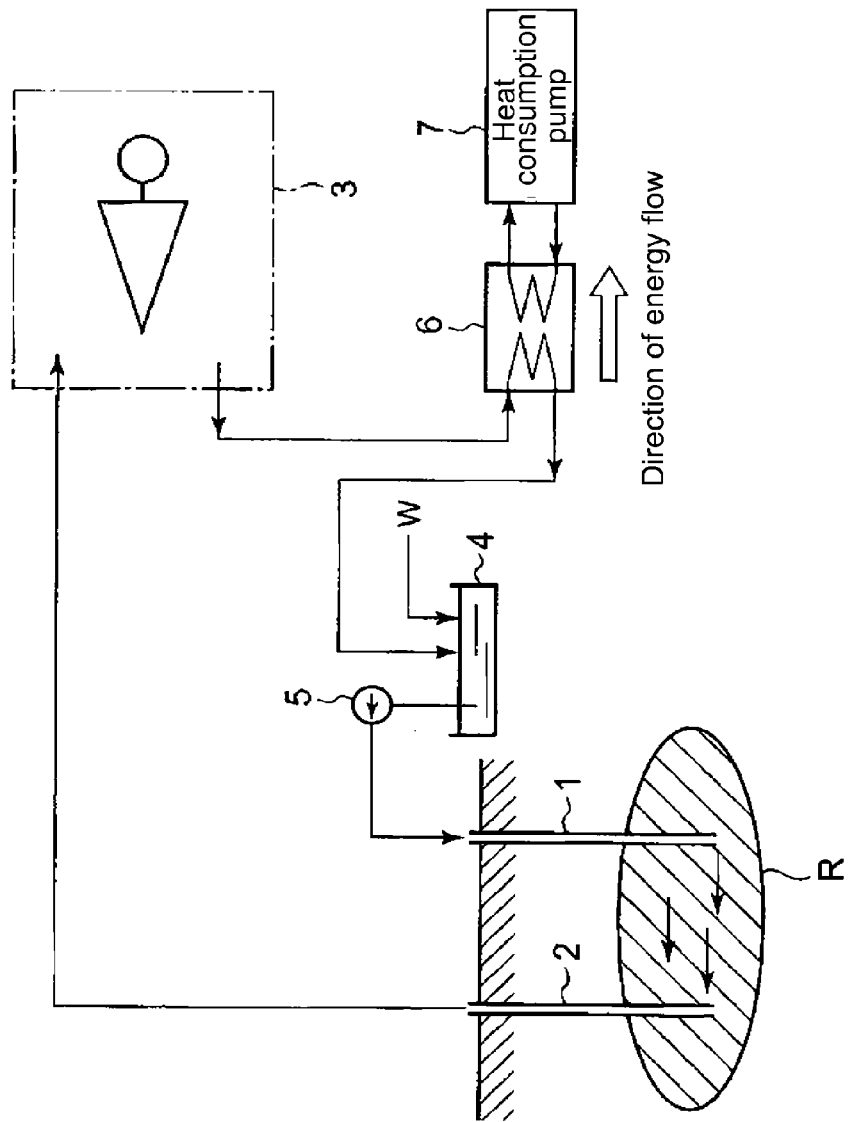
FIG. 1 explains a first embodiment regarding hot dry rock power generation system according to the present invention.

FIG. 1 shows a first embodiment regarding hot dry rock power generation system according to the present invention. The hot dry rock power generation system according to this embodiment has a recharge well 1 and a production well 2, each well being formed from the ground to an underground hot dry rock R. The hot dry rock power generation system may have a plurality of recharge wells 1 and production wells 2. Through the recharge well 1, water as a heat carrier is supplied to the hot dry rock R; the water reaching the hot dry rock R passes through the cracks in the hot dry rock R, the cracks being formed in advance by breaking the hot dry rock R into pieces by means of water pressure. Hereby, the heat carrier means a general term for fluid that carries heat. Besides fresh water, seawater that exists on the ground surface can be used as a heat carrier. The present invention has no special selection regarding the kind of the heat carrier.

Further, in passing through the hot dry rock R, the fresh water as a heat carrier receives heat and the temperature of thereof increases; thus, high temperature hot-water is generated and discharged outward from underground through the production well 2. Incidentally, the hot-water in this first embodiment means high temperature water including vaporized steam; and granite having the property of low water permeability is preferably selected as the to-be-used rock material.

The site conditions regarding the hot dry rock generation system are the following points, namely,
 a point that the geothermal gradient of the site is great,
 a point that a heat conduction pattern that the underground temperature increases in proportion to the depth below the ground is recognized, and
 a point that granite matter rocks distribute underground so as to form artificial reservoir.

Further, the hot dry rock generation system according to this embodiment is provided with:
 a power generation plant 3 that transforms the thermal energy of the hot-water discharged from the production well 2 into electric energy;
 a collecting tank 4 that stores the hot-water or warm-water discharged from the power generation plant 3;
 a sealing water pump 5 that sucks the water which is stored and naturally cooled in the collecting tank 4 or the water that is cooled by the make-up water, and delivers the sucked water into the recharge well 1.
 Since the heat carrier water sinks into the subterranean space while passing through the hot dry rock R and the amount of the heat carrier water gradually decreases, the make-up water W (cf. FIG. 1) becomes necessary.

Further, the hot dry rock generation system has a heat exchanger 6 into which the hot-water or warm-water streams; thereby, the hot-water or warm-water is the water that is discharged from the production well, and passes through the power generation plant 3. The heat exchanger 6 is provided on the downstream side of the power generation plant 3 and on the upstream side of the collecting tank 4.

Further, the hot dry rock generation system is provided with a heat consumption plant 7 that consumes the thermal energy contained in the hot- or warm-water discharged from the power generation plant 3. Accordingly, in a case where the temperature of the heat carrier discharged from the power generation plant 3 as a primary heat consumption plant is still higher than the atmospheric temperature, the heat consumption plant acts as a secondary consumption plant; thus, the thermal energy is effectively utilized in two stages. Further, since the temperature of the fluid that enters the collecting tank 4 can be reduced to a level near to the atmospheric temperature, white smoke occurrence from the collecting tank 4 can be evaded; in addition, the workers who are in the neighborhood of the collecting tank 4 can evade potential burns. Moreover, an advantage is brought about so that countermeasures against the high temperature regarding the sealing water pump 5 feeding the water back to the hot dry rock 6 can be dispensed with.

The heat consumption plant 7 can be used for a wide range of application fields such as feeding water preheating apparatus in various type of boilers, combustion air preheating apparatus in various type of combustion devices, and heat source in district heating and cooling facilities. Further, when the residual heat energy that has been conventionally disposed of is utilized for air conditioning in district heating and cooling facilities, for instance, in a school (area), considerable heat energy can be saved. In addition, carbon dioxide ($CO_2$) generation can be reduced. Thus, the approach according to this embodiment can greatly contribute to a regional warming-countermeasure.

Figure 2:
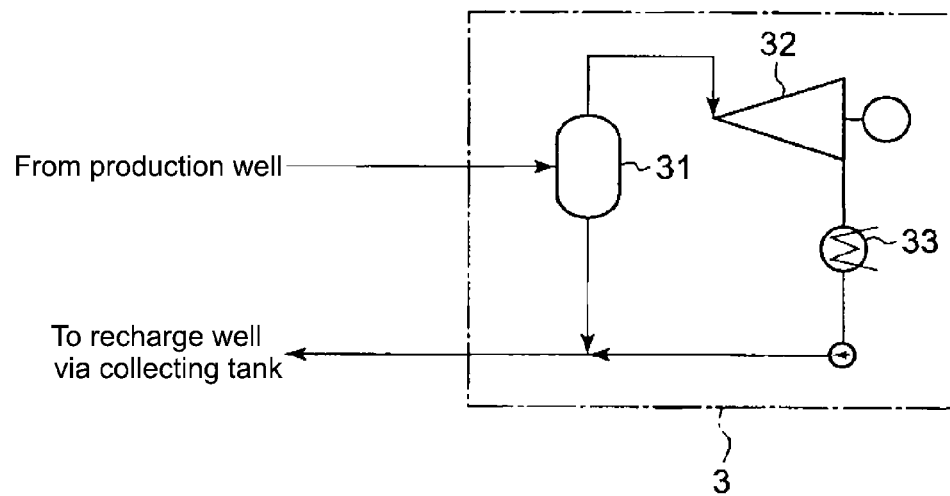
FIG. 2 explains the configuration of the power generation plant in FIG. 1.

As shown in FIG. 2, the power generation plant 3 is provided with a separator 31. The separator 31 is a device that removes the unnecessary water contents included in the steam. The steam from which the unnecessary water contents are removed in passing through the separator 31 enters a steam power generator 32. The steam power generator 32 may be configured with a publicly known component such as a steam turbine (See, for example, Patent Reference JP2003-254012).

The steam that has passed through the steam power generator 32 streams into a condenser 33. The condenser is a device that cools at constant pressure and condenses the steam (low pressure wet steam) from which power energy is extracted in the steam power generator 32, so that the condenser 33 converts the steam (low pressure wet steam) back into a saturated liquid state of a low pressure. Further, the heat carrier that has passed through the condenser 33 is recharged into the recharge well 1 via the collecting tank.

Figure 3:
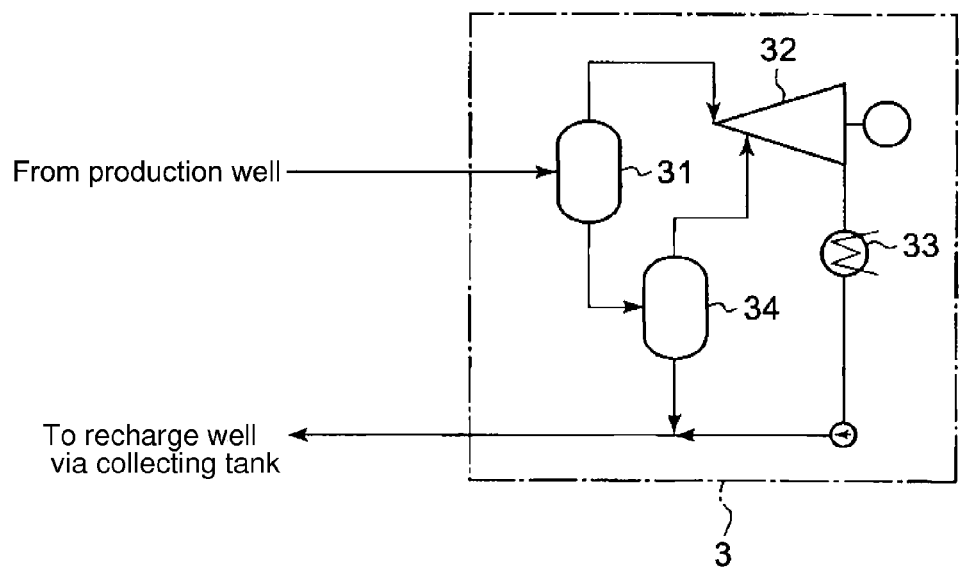
FIG. 3 explains an improved example of the power generation plant of FIG. 2.

Further, as shown in FIG. 3, the power generation plant 3 may be provided with a flusher 34. The flusher 34 has the function of boiling the pressurized hot-water from the separator 31 under a reduced pressure, as well as, the function of converting apart of the pressurized water into steam. The steam obtained in this way is sent to the steam power generator 32. On the other hand, the heat carrier that is not converted into steam joins the flow passage toward the collecting tank.

Figure 4:
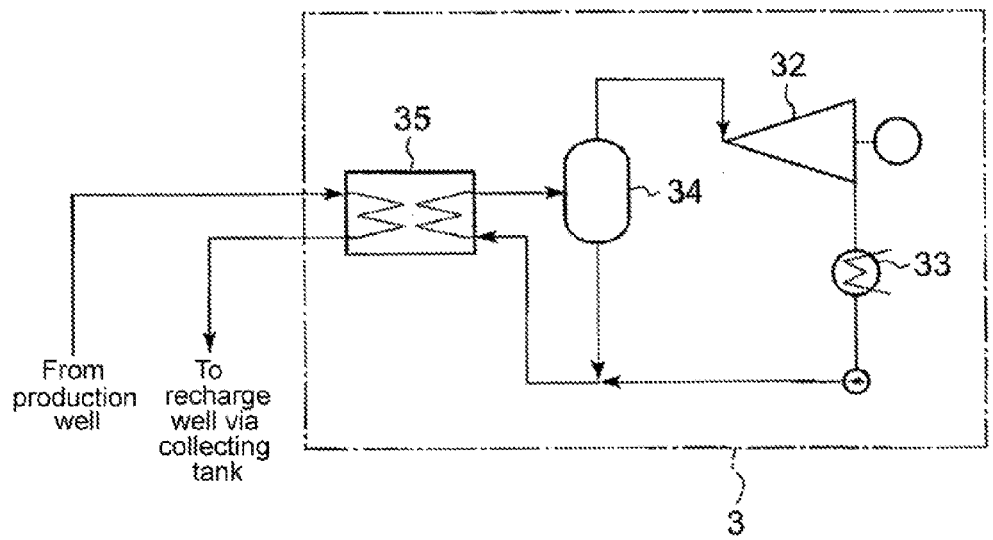
FIG. 4 explains an improved example of the power generation plant of FIG. 2.
Figure 5:
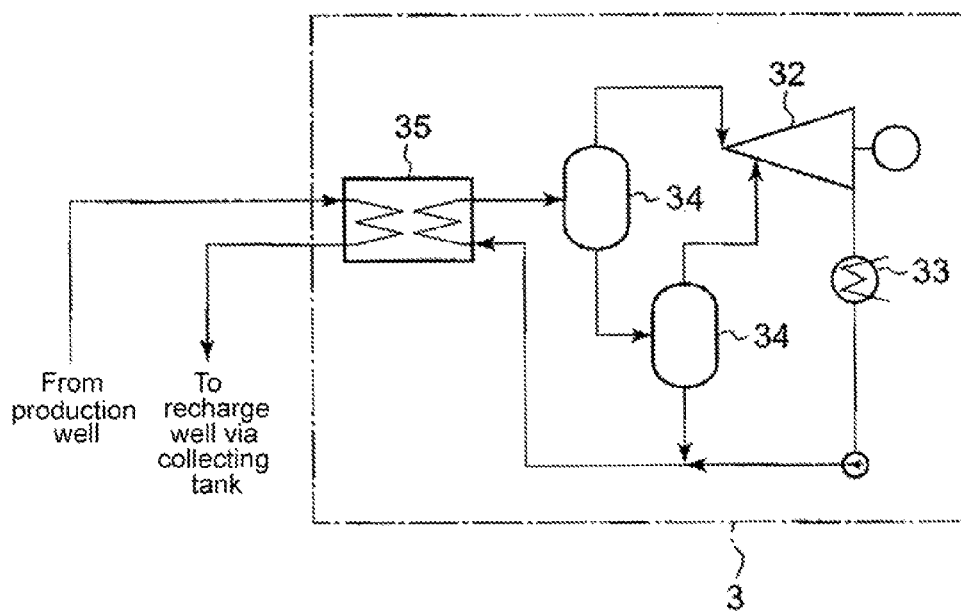
FIG. 5 explains an improved example of the power generation plant of FIG. 2.

The power generation plant shown in FIGS. 2 and 3 adopts a power generation approach that directly utilized hot-water. On the other hand, as shown in FIGS. 4 and 5, the power generation plant may be provided with a heat exchanger in the plant. In this approach, the hot-water from the production well passes through the heat exchanger 35. In the power generation plant 3 in FIG. 4, beside the pathway from the production well, a circuit passage that circulates the heat carrier such as water is formed only inside of the power generation plant. The circuit passage is provided with a heat exchanger 35, a flusher 34, a steam power generator 32 and a condenser 33. In the heat exchanger 35, the thermal energy of the hot-water from the production well is transferred to the heat carrier passing through the circuit passage on the turbine side of the power generation plant; and, a part of the heat carrier (in the circuit passage) is converted into steam at the flusher 34 so as to be sent to the steam power generator 32. The rest of the heat carrier (not converted into steam) joins the flow passage from the condenser 33 to the heat exchanger 35. Further, as shown in FIG. 5, two flushers may be provided in two stages in order to enhance the turbine output by feeding adequate steam to the steam power generator 32.

In the first embodiment as described above, since the heat exchanger 6 into which the heat carrier passing through the power generation plant 3 streams is provided, thermal energy can be transferred to a heat consumption plant 7 via the heat exchanger 6. This to-be-transferred energy is conventionally disposed of via the collecting tank 4, through natural heat dissipation process; thus, the to-be-transferred energy is conventionally wasted energy. On the contrary, in this embodiment, the waste heat energy can be utilized by appropriately setting the temperatures of the heat carrier at the proper locations. Hence, energy conservation can be realized.

(Second Embodiment)

Figure 6:
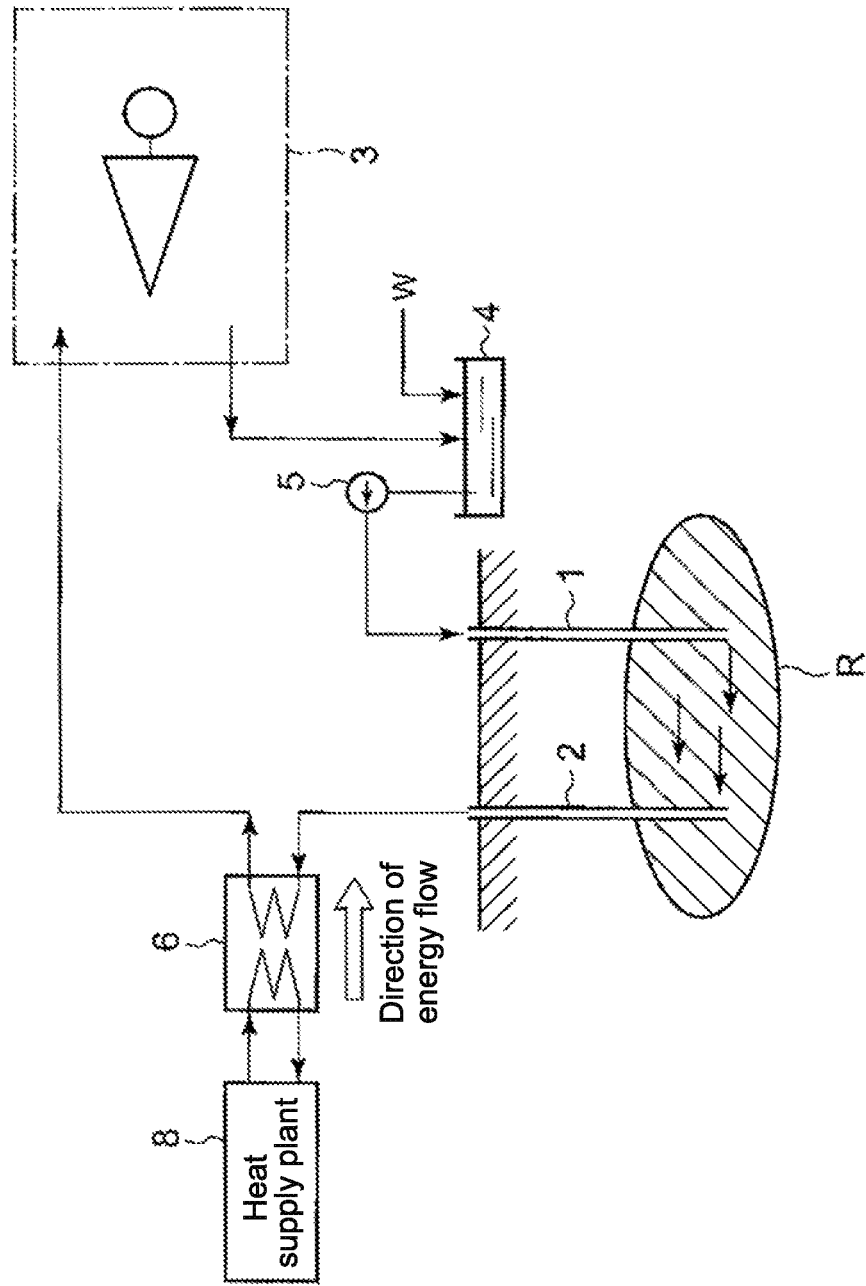
FIG. 6 explains a second embodiment regarding hot dry rock power generation system according to the present invention.

FIG. 6 shows a second embodiment regarding hot dry rock power generation system according to the present invention. Incidentally, the same components in the second embodiment as in the first embodiment are given common numerals; and, explanation repetitions are omitted.

The second embodiment differs from the first embodiment in that the arrangement of the heat exchanger is different; and, the heat exchanger 6 is connected to the heat consumption plant 7 in the first embodiment, while the heat exchanger 6 is connected to the heat supply plant 8 in the second embodiment. The heat exchanger 6 in this second embodiment is placed between the production well 2 and the power generation plant 3.

The heat supply plant 8 supplies thermal energy to the heat carrier in the hot dry rock generation system, via the heat exchanger 6. Thus, when the increase of the power output of the power generation plant 3 is required, the power increase can be realized by use of the heat supply plant 8. Thereby, it is not necessary to drill additional wells; drilling additional wells usually accompanies difficulties in drilling expenditure or drilling conditions of the site. In increasing the turbine power output, it is conventionally investigated and studied to supplement turbine power output by use of the electric power outside of the system, the electric power depending on heat source on the ground. Depending the heat source on the ground is, however, using fossil fuel; therefore, it is concluded that supplementing the output of the steam power generator by use of the heat source outside of the system is undesirable in view of $CO_2$ reduction.

For instance, a solar collector or a wind turbine plant can be used as the heat supply plant 8. A gas turbine generator plant can be used when the fuel of the gas turbine is natural gas that is expected to generate lesser $CO_2$ in comparison with heavy fuel oil, and the gas turbine plant is not provided with an exhaust gas boiler that can generate warm water by use of the exhaust gas. Applying the gas turbine in this way does not accompany the increase of $CO_2$ generation; combining the gas turbine plant with the hot dry rock generation system increases the total electric power output; further, the temperature of the exhaust gas emitted from the gas turbine can be reduced. Thus, heat pollution is reduced and the environmental preservation in the local area can be achieved to a large extent.

In addition to the above, the advantage according to the second embodiment is now pointed out in view of another aspect. In a case of, for instance, a hot dry rock generation system of 50 MW, more than 20 wells become necessary in order to generate the rated power output. Drilling such many wells needs a long period of work.

The rated power output can be generated usually after all the wells are drilled; however, according to this embodiment, the operation of the rated power output can be started by use of already drilled wells, one well after another, before all the wells are drilled. Thus, in initiating the power generation plant, the stable management thereof can be achieved.

In the second embodiment, since the heat exchanger 6 into which the heat carrier discharged from the production well 2 streams is provided, the temperature of the heat carrier can be increased at the heat exchanger 6. Thus, the heat carrier of the increased temperature can increase the power output at the power generation plant 3; namely, by the aid of the thermal-energy supplemented at the heat exchanger 6, the power generation plant 3 can generate increased power, converting thermal energy into electric energy. Thus, it is unnecessary to drill additional wells. In this way, appropriately setting the temperatures of the heat carrier at the proper locations realizes energy conservation.

(Third Embodiment)

Figure 7:
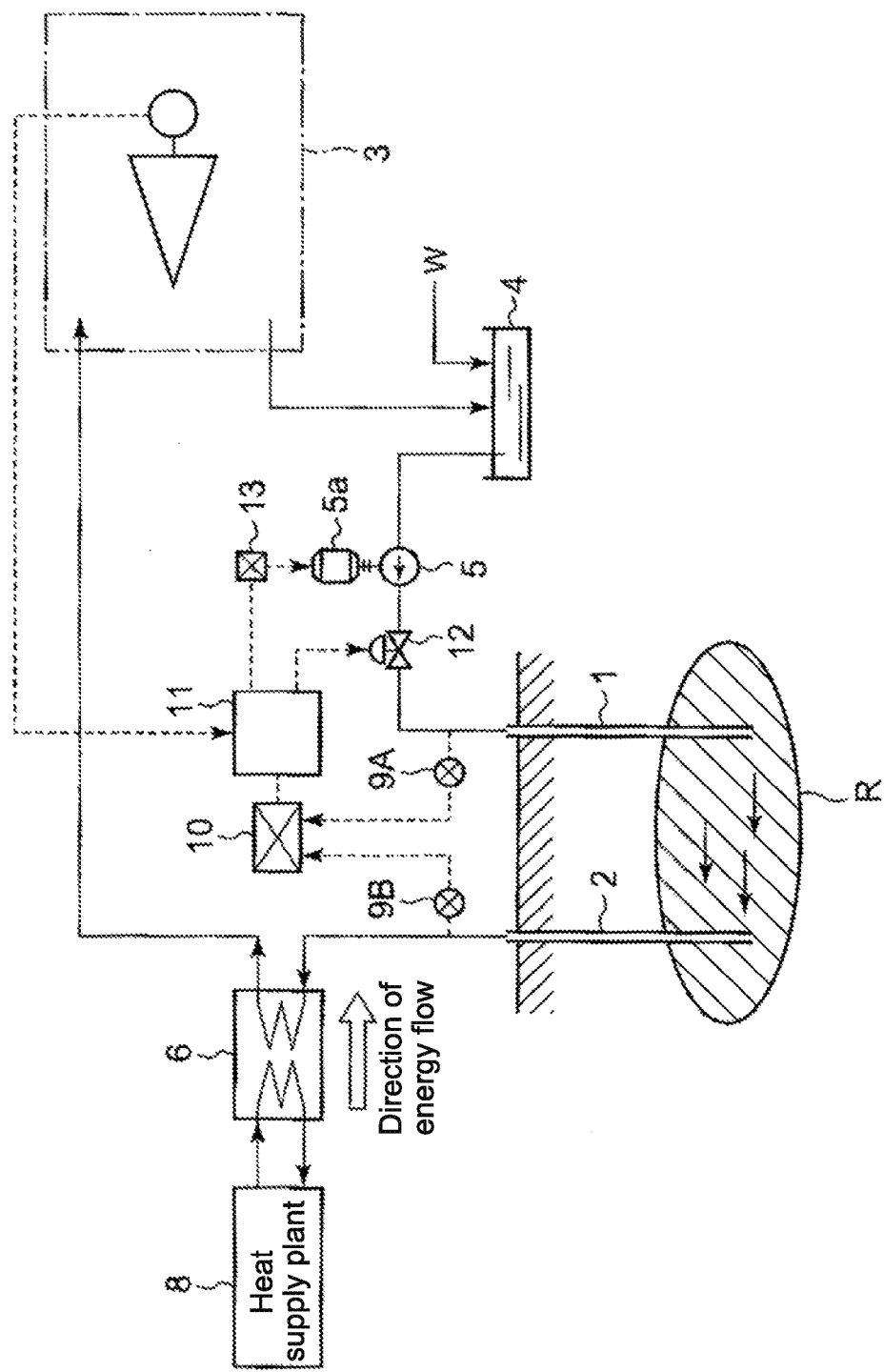
FIG. 7 explains a third embodiment regarding hot dry rock power generation system according to the present invention.
Figure 8:
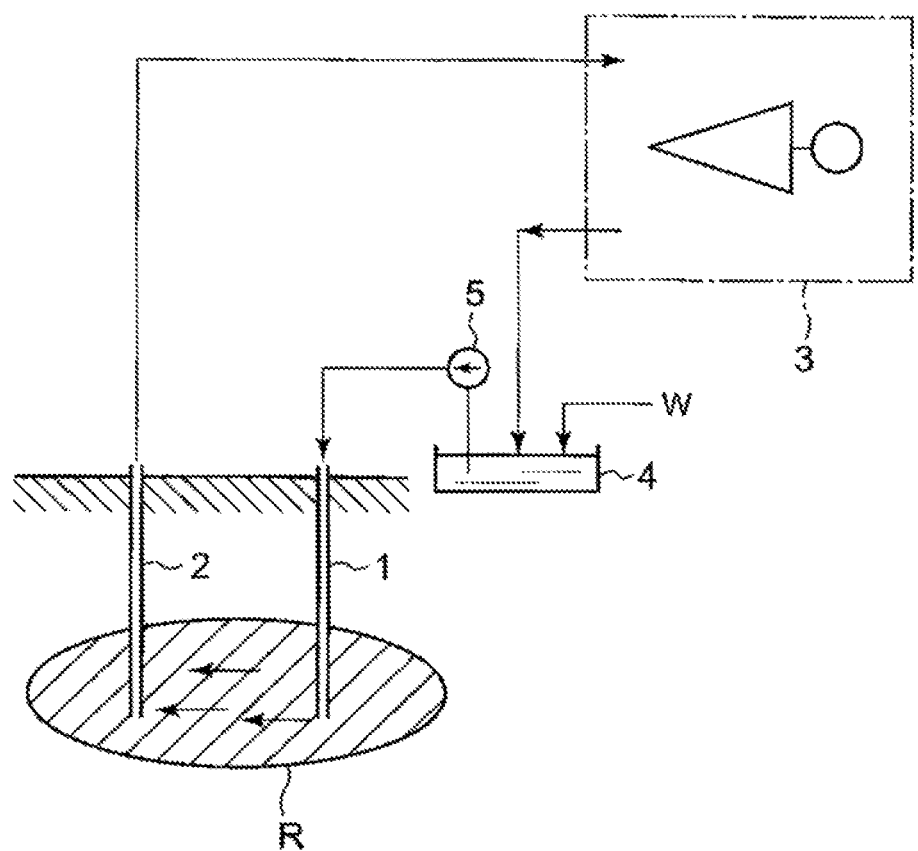
FIG. 8 explains a conventional hot dry rock power generation system.

FIG. 7 shows a third embodiment regarding hot dry rock power generation system according to the present invention. Incidentally, the same components in the third embodiment as in the first and second embodiments are given common numerals; and, explanation repetitions regarding the same components are omitted.

The third embodiment differs from the second embodiment in that the hot dry rock generation system is provided with an additional system that stabilizes the temperature and the pressure of the heat carrier discharged from the production well. The hot dry rock generation system according to this embodiment is provided with:

an RPM control unit (a rotation speed control unit) 5*a* that controls the delivery head of the sealing water pump 5; and a flow regulating valve 12 that is arranged between the sealing water pump 5 and the recharge well.

Incidentally, the flow regulating valve 12 may be arranged between the production well 2 and the power generation plant 3. The flow regulating valve 12 is an electromagnetic valve that performs proportional positioning control; namely, in the flow regulating valve 12, the spindle (not shown) inside the coil (not shown) moves in proportion to the electric current magnitude. Further, an AC (Alternating Current) motor is used as the RPM control unit 5*a*; beside this A/C motor (an RPM control unit of an electric type), a mechanical RPM control unit of a gear-shifting configuration type may be used.

Further, the hot dry rock generation system according to this embodiment is provided with a controller 11 that controls the RPM control unit 5*a*, and a computing unit 10 that computes the information so as to determine the rotation speed of the RPM control unit (the AC motor). Further, the hot dry rock generation system according to this embodiment is provided with a sensor 9A on the flow passage from the collecting tank 4 to the recharge well 1 and a sensor 9B on the flow passage from the production well 2 to the power generation plant 3, each sensor transmitting temperature information and pressure information toward the computing unit 10.

The sensor is provided not only on the production well side but also on the recharge well side; the reason is that, since the hot-water flow passage in the hot dry rock R is as long as a level of several kilometers to kilometers from the passage inlet to the passage outlet, only the feedback control cannot perform a successful RPM control, for instance, in a case where the underground hot-water pressure changes abruptly. In other words, by providing a pressure sensor not only on the production well side but also the recharge well side, control correction according to feedforward control approach is performed so that the pressure on the production well side is stabilized.

According to this third embodiment, the sensor 9A measures the temperature and the pressure of the heat carrier streaming into the recharge well 1, while the sensor 9B measures the temperature and the pressure of the heat carrier streaming out of the production well. In other words, each of the sensors 9A and 9B has the function of detecting pressures as well as temperatures. The output signals from the sensors 9A and 9B are inputted into the computing unit 10. The computing unit 10 computes the rotation speed (as an order signal value) of the RPM control unit (the AC motor) 5*a* and the opening level (as an order signal value) of the flow regulating valve 12 in order that, by regulating the temperature and the pressure of the hot-water streaming out of the production well 2, the steam power generator 32 (cf. 2) is operated under a steady condition The information regarding the computed results is transmitted to the controller 11, which transmits direct current signals (DC signals) toward the RPM control unit 5a and the flow regulating valve 12. The direct current signal (DC signal) toward the RPM control unit 5a is converted into alternating current signal (AC signal) in a DC/AC converter 13; then, the converted A/C signal is transmitted to the RPM control unit 5a. The RPM control unit 5a is an A/C motor that is operated in response to the frequency of the A/C signal; based on the power output of the A/C motor, the sealing water pump 5 changes (regulates) the delivery head of the heat carrier. On the other hand, the direct current toward the flow regulating valve 12 reaches the coil inside of the valve 12, and changes (regulates) the position of the spindle in response to the magnitude of the direct current.

This third embodiment is as effective as the second embodiment; further, the third embodiment includes the following advantageous aspects.

In this third embodiment, the sensor 9B measures the temperatures and the pressures of the heat carrier streaming out of the production well 2; based on the measured pressures, the rotation speed of the A/C motor 5a of the sealing water pump 5 as well as the opening level of the flow regulating valve 12 is determined; thus, the flow rate and the pressure regarding the heat carrier streaming out of the production well 2 can be regulated. Accordingly, the temperatures and the pressures of the heat carrier streaming out of the production well 2 can be stabilized; further, the controller receives load setting signals from the steam power generator 32 (cf. FIG. 2) so that the hot dry rock generation system can be operated while keeping the optimal hot-water flow rate in response to the power output of the generator.

Further, the sensor 9A is provided on a part way of the flow passage from the sealing water pump 5 to the recharge well 1 so that the sensor 9 transmits the pressure information to the computing unit 10, the sensor 9A measuring the pressure of the heat carrier before the heat carrier streams into the recharge well 1; thus, the heat carrier pressure loss between the inlet of the recharge well 1 and the outlet of the production well 2 can be measured so that the change of the state of the hot dry rock can be detected. Further, the sensor 9A transmits also the temperature information to the computing unit 10, the sensor 9A measuring the temperature of the heat carrier before the heat carrier streams into the recharge well 1; thus, the heat carrier temperature difference between the inlet of the recharge well 1 and the outlet of the production well 2 can be measured so that the heat carrier temperature is detected without being influenced by the atmospheric temperature on the ground. Further, if the pressure of the heat carrier before the recharge well 2 is also measured, the flow rate measurement can be also performed; accordingly, thermal heat energy that the heat carrier obtains underground can be measured.

Incidentally, in the above-described third embodiment, an example in which the flow regulating valve 12 is combined with sealing water pump 5; however, the present invention is not limited to this example. There can be, for instance, other embodiments in which only a flow regulating valve is used, a plurality of sealing water pumps is used, and the pitch of the impellers are controlled.

Further, the above-described third embodiment shows an example in which a DC/AC converter is provided; however, a DC motor may be used as the RPM control unit, and the DC/AC converter 13 may be omitted.

Thus far, the embodiments according to the present invention have been explained; it goes without saying that the present invention is not limited to the above-described embodiment, and there can be other various modes under the condition that the modes keep the features of the present invention.

Industrial Applicability

By use of the hot dry rock generation system according to the present invention, thermal energy can be utilized and energy conservation can be realized, while the temperature of the heat carrier is appropriately regulated. The configuration regarding the features as per the present invention can be applied to a hot dry rock generation system in which a heat carrier supplied from a recharge well is made pass through the underground hot dry rock, and heat generation is performed on the ground by use of the high temperature heat carrier recovered from underground through the production well.

The invention claimed is:

1. A hot dry rock generation system comprising:
   an underground hot dry rock having a bedrock part having natural cracks therein, to which high pressure water has been supplied so as to form additional cracks in the hot dry rock such that water can penetrate the hot dry rock;
   a recharge well that extends from a ground level to the underground hot dry rock having the cracks into which water serving as a heat carrier is charged through the recharge well;
   a production well that extends from the ground level to the underground hot dry rock having the cracks, from which the water heated by the hot dry rock and steam of the water stream out to the ground level through the production well;
   a power generation plant that converts thermal energy of the water and steam streaming out of the production well into electric energy;
   a collecting tank that stores the water discharged from the power generation plant;
   a sealing water pump that sucks the water collected in the collecting tank and makes the water stream into the recharge well,
   a first heat exchanger provided on a route to the collecting tank from the power generation plant; and
   a heat consumption plant that consumes thermal energy from the first heat exchanger,
   wherein the heat consumption plant cools the water and the steam guided to the collecting tank via the heat exchanger so that the temperature of the water discharged into the collecting tank is decreased to a level close to an ambient temperature;
   and an open loop recirculation wherein the water circulates from the recharge well via the hot dry rock, the production well, the power generation plant, the first heat exchanger, the collecting tank and the recharge well to the hot dry rock.

2. The hot dry rock generation system according to claim 1, wherein a second heat exchanger is arranged between the production well and the power generation plant, the hot dry rock generation system further comprising a heat supply plant that supplies the thermal energy to the second heat exchanger.

3. The hot dry rock generation system according to claim 1, wherein one side of the heat exchanger is arranged between the power generation plant and the collecting tank, the hot dry rock generation system further comprising a heat consumption plant that consumes the thermal energy supplied to the other side of the heat exchanger in an open loop recirculation system.

4. The hot dry rock generation system according to claim 1, wherein the hot dry rock generation system further comprises:
- a motor that drives and rotates the sealing water pump;
- a flow regulating valve that is arranged between the sealing water pump and the recharge well, or between the production well and the power generation plant;
- a first sensor that is arranged on a flow passage provided between the production well and the power generation plant such that the sensor detects information regarding a heat carrier pressure;
- a computing unit that computes a delivery head of the sealing water pump and an opening level of the flow regulating valve based on the information regarding the heat carrier pressure detected by the sensor;
- an RPM control unit that controls the delivery head of the sealing water pump by controlling a rotation speed of the motor based on signals computed by the computed unit; and
- a second sensor that is arranged on a flow passage provided between the sealing water pump and the recharge well such that the sensor detects a heat carrier pressure in the flow passage between the sealing water pump and the recharge well;
- wherein the computing unit computes the delivery head of the sealing water pump and the opening level of the flow regulating valve based on the information regarding the hear carrier pressure of the flow passage provided between the production well and the power generation plant; and
- a feedforward correction is incorporated in a computing result by the computing unit based on the heat carrier pressure in the flow passage between the sealing water pump and the recharge well detected by the second sensor.

5. The hot dry rock generation system according to claim 4, wherein the sensor that transmits the temperature information to the computing unit is arranged on the flow passage provided between the production well and the power generation plant, and the difference between the temperature of the heat carrier at the outlet of the production well and the temperature of the heat carrier at the inlet of the recharge well is measured.

* * * * *